June 22, 1965

R. J. HAMMERS 3,189,975

CUTTING TOOL HOLDER

Filed July 1, 1963

Raymond J. Hammers,
Inventor.
Koenig, Pope, Senniger and Powers,
Attorneys.

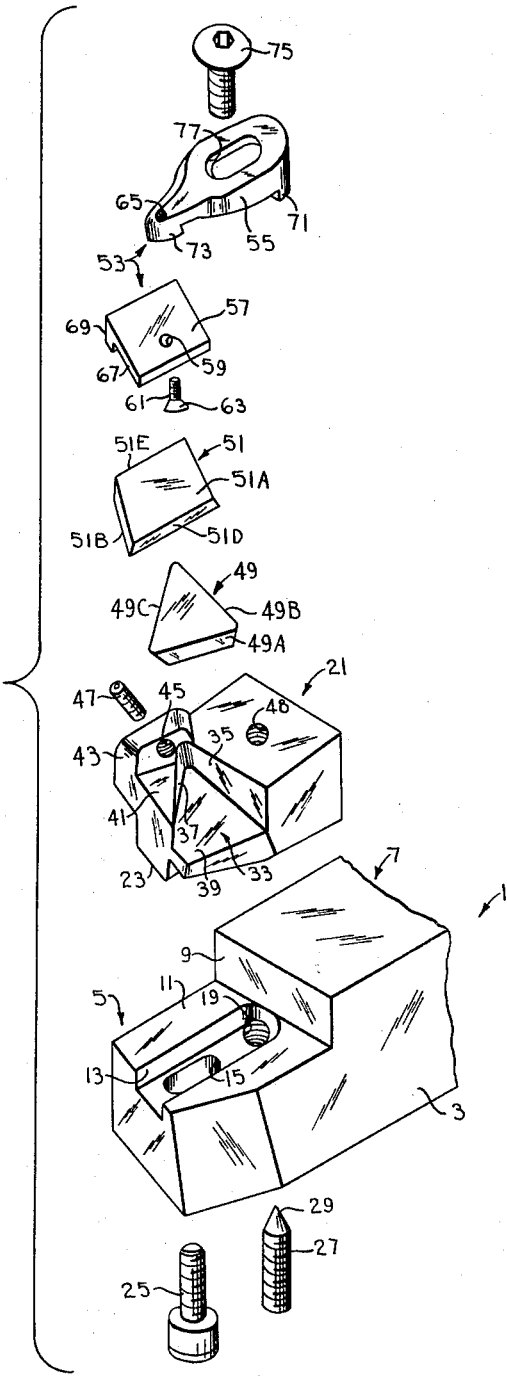

3,189,975
CUTTING TOOL HOLDER
Raymond J. Hammers, Peoria, Ill., assignor to Trasco Inc., Peoria, Ill., a corporation of Illinois
Filed July 1, 1963, Ser. No. 291,866
11 Claims. (Cl. 29—96)

This invention relates to cutting tool holders, and more particularly to a cutting tool holder for holding replaceable cutting elements employed in machining operations, such as milling, boring, planing, turning, shaping, and the like.

In cutting tools, a chip that is cut from a revolving stock can be controlled as to size and length by a chip breaker. The chip breaker has a wear surface which is inclined to the cutting edge so that the chip is formed into a spiral that is easily removed. When a cutting tool is employed on pieces of stock having a different hardness or brittleness, the formation of the chips will frequently change. When this occurs it necessitates the stopping of the machine and the resetting of the angle of the chip breaker with respect to the cutting tool, or the resetting of the distance between the cutting edge of a tool and the chip breaker. This, of course, is time consuming and it is desirable to have an adjustment for the chip breaker that may be made accurately and in a minimum of time.

Among the several objects of the inventon may be noted the provision of such a tool holder in which a quick and simple adjustment for an insert cutting tool or element and a chip breaker adjacent the cutting element is provided, the chip breaker being readily capable of adjustment relative to the cutting element; the provision of a tool holder such as described adapted firmly to hold and secure a cutting element and adjacent chip breaker in position for cutting; the provision of a tool holder such as described in which a replaceable cutting element may be easily and quickly replaced or turned to present different cutting edges; the provision of a tool holder such as described in which the seat for the cutting element is simply and easily removably secured in adjustable manner to the body of the to holder in such a manner that no relative movement occurs therebetween when the cutting element is employed; and the provision of such a tool holder which is economical to manufacture and simple in operation. Briefly described, my invention comprises a tool holder having a cutting element and adjacent chip breaker thereon with adjustable clamping means securing the chip breaker and cutting element on the tool holder in adjustable relation to each other. The adjustable clamping means comprises a clamp arm pivotally carring on one end a hold-down member adapted to fit over the chip breaker with an over-lapping angle portion contacting the rear edge of the chip breaker, the clamp arm being secured at its other end by a bolt passing through an elongate slot in the clamp arm, and means to contact and move the hold-down member and the chip breaker in a direction toward the cutting edge of the cutting element. Other objects and features will be in part apparent and in part pointed out hereinafter.

The invention accordingly comprises the constructions hereinafter described, the scope of the invention being indicated in the following claims.

In the accompanying drawings in which one of various possible embodiments of the invention are illustrated, FIG. 1 is a plan of a cutting tool holder embodying the present invention;

FIG. 6 is an exploded view of the tool holder of FIG. 1 illustrating the several components of the tool holder.

Corresponding reference characters indicate corresponding parts throughout the several views of the drawings.

Figure 1:
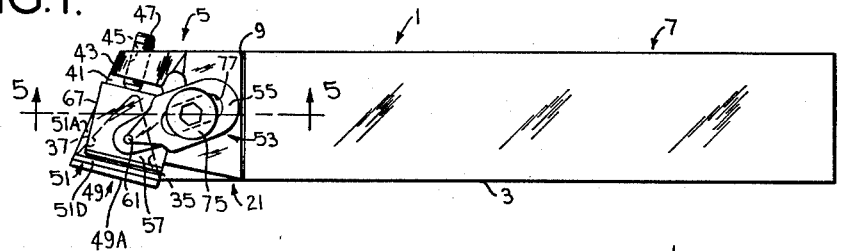
Figure 2:
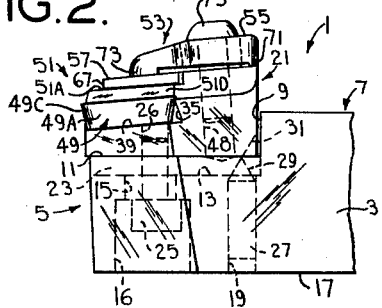
FIG. 2 is a front elevation of a tool holder of FIG. 1.

Referring to the drawings, a cutting tool holder is designated generally by numeral 1. Tool holder 1 comprises an elongate shank 3 formed of square bar stock having a forward end portion designated generally at 5 and a rear shank portion designated generally 7. Forward end portion 5 is stepped to provide a rear wall or shoulder 9 and a supporting surface or seat 11. Supporting surface 11 is in a plane generally at right angles to the plane of wall 9. A slotted keyway or groove 13 in surface 11 extends from the forward end of the tool holder toward wall 9. An elongate slot 15 leads from the bottom of the keyway or groove 13 to an enlarged opening 16 extending to bottom 17 of tool holder 1. Also communicating with the keyway or groove 13 is a threaded opening 19 extending through forward end portion 5 from bottom 17 and being generally parallel to slot 15.

Figure 5:
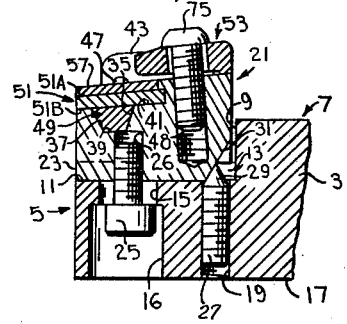
FIG. 5 is a section taken on line 5—5 of FIG. 1.

Mounted on forward end portion 5 is an anvil or block generally designated 21 and having a key or tongue 23 on the bottom thereof received within the keyway or groove 13 for sliding movement. To secure anvil 21 in place, a threaded stud or screw 25 in slot 15 engages a threaded opening 26 in the bottom of anvil 21. Thus, anvil 21 may be adjusted back and forth relative to the forward end of the tool holder, the screw 25 being moved back and forth within elongate slot 15. To prevent the movement of anvil 21 toward wall 9 when screw 25 is tightened, such as might occur from pressure exerted on the forward end of anvil 21 during the cutting operation causing screw 25 to slip in slot 15, a threaded pin or set screw 27 is threaded in opening 19. Set screw 27 has an upper tapered generally conical end 29 engaging a sloping or inclined rearwardly facing surface 31 on anvil 21 (FIG. 5). Thus, to position anvil 21, screw 25 is first tightened with set screw 27 withdrawn from engagement with anvil 21. Then, the set screw 27 is seated against rearwardly facing surface 31. Screws 27 and 25 may be of the Allen-head type to permit easy adjustment.

At the top of anvil 21 is a pocket or recessed portion 33 defined by walls or shoulders 35 and 37 which converge toward one another. The bottom of pocket 33 constitutes a tool seat 39 formed between walls 35 and 37, and extends in a plane at right angles to the planes of walls 35 and 37. A support ledge 41 is provided at the upper edge of wall 37 and a shoulder or lug 43 extends upward from ledge 41. A threaded opening 45 extends through lug 43 and a set screw 47 is threaded in opening 45. A threaded opening 48 extends from the upper face of anvil 21.

Received within pocket 33 is an insert cutting tool or element generally designated 49, which is of triangular configuration having cutting edges 49A, 49B, and 49C. The degree of inclination of the cutting edges 49A, 49B, and 49C determines the rake angle for the cutting edges. While cutting edge 49A is shown in cutting position in the drawings, it is to be understood that any of the edges 49A, 49B, and 49C may be positioned in cutting relation and upon the wearing of one of the cutting edges, insert tool 49 may be removed and another cutting edge thereon may be presented by turning of the cutting tool. While pocket 33 and cutting tool 49 have been shown as triangular in configuration, it is to be understood that cutting element 49 could be round, square, or otherwise prismatic in shape.

Carried on the upper face of cutting tool 49 is a chip breaker 51 having generally flat coplanar faces 51A and 51B. Chip breaker 51, as shown, is of generally rectangular configuration and may be economically formed from worn-out cutting tools of a generally rectangular shape. Face 51B is placed in contact with cutting element 49 and extends over ledge 41. It is to be noted that wall 35 is of a greater height than wall 37 and an edge of chip breaker 51 is disposed adjacent wall 35. A front edge 51D of chip breaker 51 is positioned adjacent cutting edge 49A of cutting tool 49 and a rear edge 51E opposite edge 51D is positioned adjacent lug 43.

Figure 4:
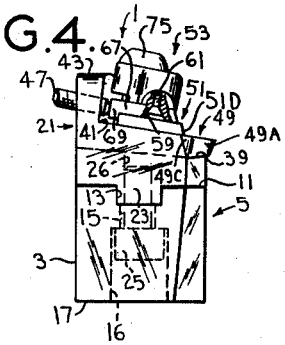
FIG. 4 is a side elevation of the tool holder of FIG. 1, with certain parts broken away.
Figure 3:
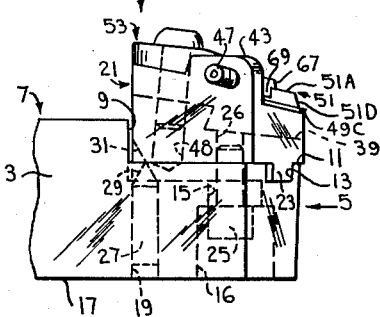
FIG. 3 is a rear elevation of the tool holder of FIG. 1.

Mounted over chip breaker 51 to secure cutting tool 49 and chip breaker 51 in place and to permit adjustment of chip breaker 51 is an adjustable clamping unit designated generally 53. Unit 53 comprises a clamp arm 55 and a hold-down member or jaw 57. Hold-down member or jaw 57 has a countersunk opening 59 (FIG. 4) and a threaded screw 61 having a conical head 63 is received in countersunk opening 59. Clamp arm 55 has a threaded opening 65 and screw 61 is threaded therein to pivotally carry hold-down member 57. Hold-down member 57 is generally angle-shaped and comprises legs 67 and 69, leg 67 overlying face 51A of chip breaker 51 and leg 69 overlapping and contacting the rear edge 51E of chip breaker 51. Clamp arm 55 has inner extensions 71 and 73 at the bottom thereof, extension 71 being adapted to engage the upper surface of anvil 21 and extension 73 being adapted to contact leg 67 of hold-down member 57. To mount clamping unit 53 in place, a threaded bolt or clamp screw 75 extends through an elongate slot 77 in clamp arm 55 and is received in threaded opening 48 of anvil 21. Upon screwing down bolt 75, leverage is exerted through extension 73 upon hold-down member 57 and member 57 is pressed against chip breaker 51 which, in turn, is pressed against cutting element 49.

To move chip breaker 57 toward cutting edge 49A, bolt 75 is loosened and set screw 47 which contacts leg 69 is screwed in the direction of leg 69 to push chip breaker 51. The elongate slot arrangement of clamp arm 55 allows chip breaker 51 to be moved in an angular relation to the clamp arm. After chip breaker 51 is positioned, bolt 75 is then screwed down. It is to be noted that screw 47 and leg 69 act as a stop for chip breaker 51 and prevent movement of the chip breaker away from the cutting edge of tool 49. To move chip breaker 51 away from the cutting edge 49A, set screw 47 is backed up to permit clamp arm 55 and hold-down member 57 carried thereby to be swung away from cutting edge 49A. It is to be understood that cutting element 49, and chip breaker 51, being mounted on anvil 21, are moved back and forth relative to the forward end of cutting tool holder 1 along with anvil 21 upon adjustment of the anvil, as previously mentioned.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A tool holder for an insert cutting tool having a tool seat, an insert cutting tool positioned on said seat and having a cutting edge adjacent the forward end, a chip breaker having generally flat parallel faces disposed in face-to-face contact with the face of the cutting tool opposite the seat and having a rear edge opposite the cutting edge of the tool, a hold-down member for the chip breaker in face-to-face contact with the face of the chip breaker opposite the cutting tool and having an overlapping portion contacting said rear edge of the chip breaker, an adjusting member in contact with the overlapping portion to move the hold-down member and chip breaker toward the cutting edge of the tool, and means to clamp the hold-down member onto the chip breaker including a clamp arm pivotally carrying the hold-down member on one end and having an elongate slot adjacent the other end, and a bolt extending through said slot to secure the clamp arm onto the tool holder and permitting adjustment of the clamp arm along the elongate slot.

2. A tool holder for an insert cutting tool comprising a shank having a recessed forward end to form a supporting surface, an anvil mounted on said supporting surface for movement toward and away from the forward end, said anvil having a tool seat, an insert cutting tool on said seat and having a cutting edge adjacent the forward end of the shank, a chip breaker having generally flat parallel faces disposed in face-to-face contact with the face of the cutting tool opposite the seat and having a rear edge opposite the cutting edge of the tool, and a clamping unit to secure the cutting tool and chip breaker, said clamping unit comprising a clamp arm having an elongate slot adjacent one end and a hold-down member pivotally carried by the other end of the clamp arm, the hold-down member having a generally flat face opposite the clamp arm being in contact relation to the chip breaker, and adjustable means extending through said slot to secure the clamp arm onto the anvil and to press the clamp arm against the hold-down member.

3. A tool holder as set forth in claim 2 wherein the hold-down member has a portion overlapping and contacting the rear edge of the chip breaker, and a set screw is positioned on the anvil in contact with the overlapping portion to move the hold-down member and chip breaker toward the cutting edge of the tool when turned in one direction and to permit the hold-down member and chip breaker to be backed up when turned in an opposite direction.

4. A tool holder as set forth in claim 2 which further includes means adjusting the anvil for movement toward and away from the forward end of the shank, the adjusting means comprising a bolt mounted in an elongate slot extending through the body of the shank adjacent said forward end, the bolt being removably secured to the anvil and permitting adjustment of the anvil toward and away from said forward end, and an adjustable wedge adapted to engage the anvil to limit rearward movement of the anvil when the wedge is in engagement with the anvil.

5. A tool holder as set forth in claim 4 wherein the anvil has a slanted rearwardly facing surface and the adjustable wedge comprises an adjustable pin extending through the body of the shank and having a tapered end adapted to engage the rearwardly facing surface of the anvil and thereby stop any rearward movement of the anvil.

6. A tool holder comprising a body having a cutting tool seat and an abutment at the rear of said seat, a cutting tool on said seat having a forward cutting edge, a chip breaker overlying said cutting tool and adapted for forward and rearward adjustment relative to said tool, a jaw engageable with the top of said chip breaker, said jaw having a portion backing the chip breaker, an adjusting member associated with said abutment engageable with said backing portion of said jaw and adjustable in relation to said abutment for determining various positions of adjustment of the jaw and chip breaker, and means for clamping said jaw on the chip breaker after adjustment of the jaw and chip breaker comprising an arm carrying the jaw, and means for releasably securing the arm to the body.

7. A tool holder as set forth in claim 6 wherein said means for releasably securing the arm to the body comprises a clamp screw extending through a slot extending lengthwise of said arm.

8. A tool holder as set forth in claim 7 wherein said jaw is mounted on said arm for pivotal movement relative to the arm about an axis generally parallel to said screw.

9. A tool holder as set forth in claim 1 wherein the tool holder comprises a shank having a recessed portion on its forward end constituting a supporting surface and formed with a keyway therein, an anvil mounted in said recessed portion on said supporting surface for movement in the direction of the keyway and having a key slidable in the keyway, the anvil defining said tool seat, said shank having an elongate slot in said recessed forward end portion extending lengthwise of said keyway, a screw extending through said slot and threaded in a hole in said anvil, and a set screw threaded in the anvil and having a conical end extending into the keyway adjacent one end thereof and engageable by the respective end of the anvil.

10. A tool holder comprising a shank having a recessed forward end to form a supporting surface with a keyway therein, an anvil mounted on said supporting surface for movement in the direction of the keyway and having a key slidable in the keyway, said anvil having a tool seat, an insert cutting tool on the seat, means for clamping the cutting tool on the seat, said shank having an elongate slot extending lengthwise of said keyway, a screw extending through said slot and threaded in a hole in said anvil, and a set screw threaded in the anvil and having a conical end extending into the keyway adjacent one end thereof and engageable by the respective end of the anvil.

11. A tool holder as set forth in claim 10 wherein the anvil has an inclined surface at its said respective end thereof engageable with said conical end of said set screw.

References Cited by the Examiner

UNITED STATES PATENTS

| 2,322,578 | 6/43 | Kutscha. | |
| 2,625,068 | 6/53 | Smith | 29—96 |
| 2,967,345 | 1/61 | Novkov | 29—96 |
| 3,052,952 | 9/62 | Bader | 29—96 |
| 3,059,316 | 10/62 | Bader | 29—96 |
| 3,102,326 | 9/63 | Conti | 29—96 |

FOREIGN PATENTS

| 218,334 | 4/61 | Austria. |
| 88,701 | 3/60 | Denmark. |
| 1,084,955 | 7/54 | France. |
| 868,012 | 5/61 | Great Britain. |

WILLAM W. DYER, JR., *Primary Examiner.*